United States Patent [19]

Hall et al.

[11] 4,031,521

[45] June 21, 1977

[54] MULTIMODE PROGRAMMABLE MACHINES

[75] Inventors: Phil H. Hall; John W. Irwin, both of Longmont, Colo.

[73] Assignee: International Business Machines Corporation, Armonk, N.Y.

[22] Filed: Oct. 15, 1971

[21] Appl. No.: 189,576

[52] U.S. Cl. .............................................. 364/200
[51] Int. Cl.[2] .......................................... G06F 9/16
[58] Field of Search .................... 340/172.5; 445/1

[56] References Cited

UNITED STATES PATENTS

| | | | |
|---|---|---|---|
| 3,387,276 | 6/1968 | Reichow | 340/172.5 |
| 3,573,751 | 4/1971 | DeLisle | 340/172.5 |
| 3,576,541 | 4/1971 | Kwan | 340/172.5 |
| 3,593,297 | 7/1971 | Kadner | 340/172.5 |
| 3,623,011 | 11/1971 | Bayard, Jr. et al. | 340/172.5 |
| 3,633,174 | 1/1972 | Griffin | 340/172.5 |
| 3,641,505 | 2/1972 | Artz et al. | 340/172.5 |

Primary Examiner—Harvey E. Springborn

Attorney, Agent, or Firm—Herbert F. Somermeyer

[57] ABSTRACT

The disclosure teaches that a cyclable program loop can be alternatively used to selectively initiate subprograms or as a timing signal generator, the latter preferably in a maintenance mode of a machine in which the loop resides. A programmable machine has a cyclable program loop with a preset number of program steps. First sequences of internal machine operations cooperate with said loop such that, based upon detection of predetermined status signals, one of a plurality of object programs may be initiated. In a second mode of operation, the status signals are suppressed; and the cyclable program loop is selectively used in a second mode or as in said first mode. In a preferred form, the second mode, the cyclable program loop, is a timing cycle usable in connection with maintenance procedures on the programmable machine. At the expiration of each timing cycle, the loop supplies a reference signal for operating a second set of internal machine functions. Such timing operations are preferably interleaved with first mode functions.

8 Claims, 10 Drawing Figures

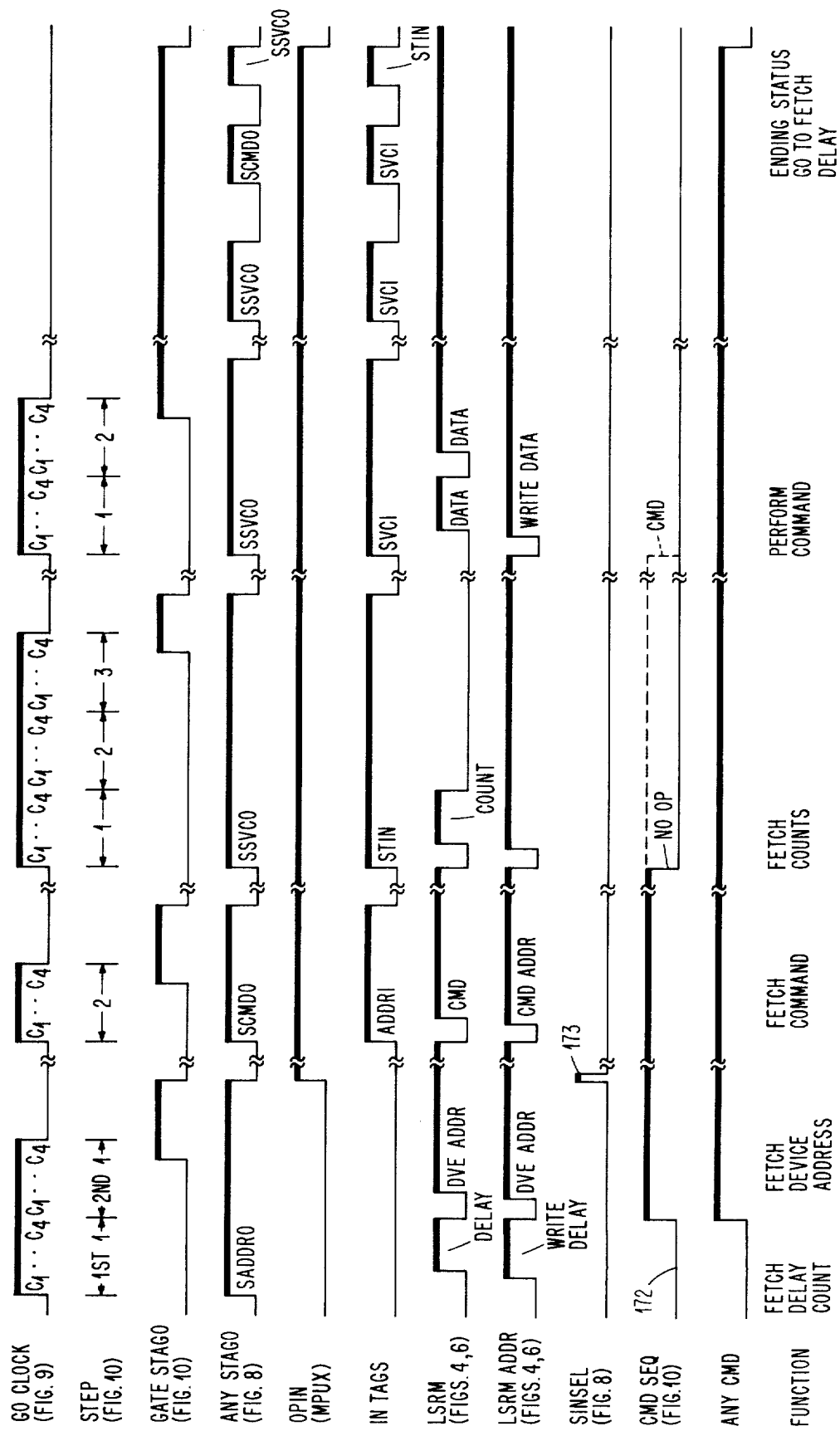

MULTIMODE PROGRAMMABLE MACHINES

RELATED PATENT APPLICATION

Ser. No. 77,088; filed Oct. 1, 1970; entitled "Microprogrammable I/O Controller"; by John W. Irwin; now U.S. Pat No. 3,654,617; commonly assigned.

BACKGROUND OF THE INVENTION

The present invention relates to programmable digital machines, particularly those machines having a read only control store (ROS) and adaptable to be used with or in peripheral data processing sub systems.

Many small programmable digital machines, such as those commonly referred to as mini-computers, as well as programmable I/O controllers, for cost reasons, use read only store (ROS) for resident control programs. Such machines may have all of the resident control programs in such ROS. Alternatively, such machines may not only have a ROS control memory but also an electrically alterable control memory. In some situations, the control memory may be writable; but the program functions are time shared such that program execution time is less than machine function execution time (hardware sequences and the like take longer than execution of the controlling program).

In such machines, cost is an overriding factor. This means that the number of electronic circuits and the number of words used in ROS or other forms of control memory should be minimized to the greatest extent possible. This factor is particularly important when large numbers of such machines are to be constructed.

In programmable machines, there is usually an executive routine sometimes referred to as "IDLESCAN" in programmable I/O controllers. This executive routine selects and initiates various object programs stored in ROS which accomplish predesignated machine functions. Such object programs and executive routines are used in normal data processing operations and for controlling peripheral device subsystems. This sequence is termed a "first mode of operation".

In addition to the operating or first mode of operation, each programmable machine usually has a diagnostic mode of operation which may be controlled from a maintenance panel usually mounted on or pluggable into the machine. Additionally, a large number of electronic circuits, manual switches, and the like, may be included in such a maintenance section. The diagnostic or maintenance mode of operation includes what is termed a "second mode of operation". In such second mode, the functions performed may be quite different than in the first mode. In some operational situations, the programmable machine may alternately operate in said first and second modes, all while under diagnostic procedures. The present invention not only enhances such diagnostic procedures, but enables a more efficient usage of selected computer programs in certain types of machines and operations.

SUMMARY

It is an object of the present invention to provide improved efficiency of control programs within programmable machines by enabling plural usages of a program for entirely different and unrelated purposes.

A related object is to enable a program to control a machine in first and second senses.

Another object is to provide a unique program signal generator usable in another mode for controlling the same machine.

A feature of the present invention includes a programmable machine utilizing a single sequence of program steps to perform a first set of internal machine operations in a first mode of operation and a second mode of operation which accomplishes a second set of internal machine operations unrelated to the first set.

In accordance with the invention, a multimode programmable machine has a cyclable program loop having a predetermined number of program steps. Means in the machine establish first and second modes of operation. First sequences of machine operation cooperate with said cyclable program loop during the first mode in a manner to interrupt the cyclable program loop upon certain events occurring within the machine and then executing predetermined machine functions. Second sequences of machine operation within the machine cooperate with the same group of program steps. In a second mode of operation, in accordance with recycling the program loop, perform a second set of machine operations unrelated to the first set. The modes are preferably automatically interleaved.

In a preferred form of the invention, the first mode of operation is a data processing mode; and the second mode is a maintenance mode. In the second mode, maintenance circuits within the machine operate with cyclable program loop and other programs to effect test and diagnostic functions including special wrap-around circuit functions at the interface portions of the machine. During the second mode, timing aberrations and the like are provided by a comparison circuit jointly responsive to the cyclable program loop and to other test circuits resident in the machine, which may include separate programmable means. A maintenance panel inserts data into the test circuits for instituting the timing aberrations. Further, circuit modifications can be accomplished through plugboard or alligator clip devices. Also, devices or other machines may control or monitor operation during either mode of operation.

The foregoing and other objects, features, and advantages of the invention will be apparent from the following more particular description of the preferred embodiment of the invention, as illustrated in the accompanying drawings.

BRIEF DESCRIPTION OF THE DRAWINGS

FIG. 5 is a simplified timing diagram illustrating the operation of the invention with respect to the FIG. 4 illustrated apparatus.

GLOSSARY OF ABBREVIATIONS AND ACRONYMS

Figure 1:
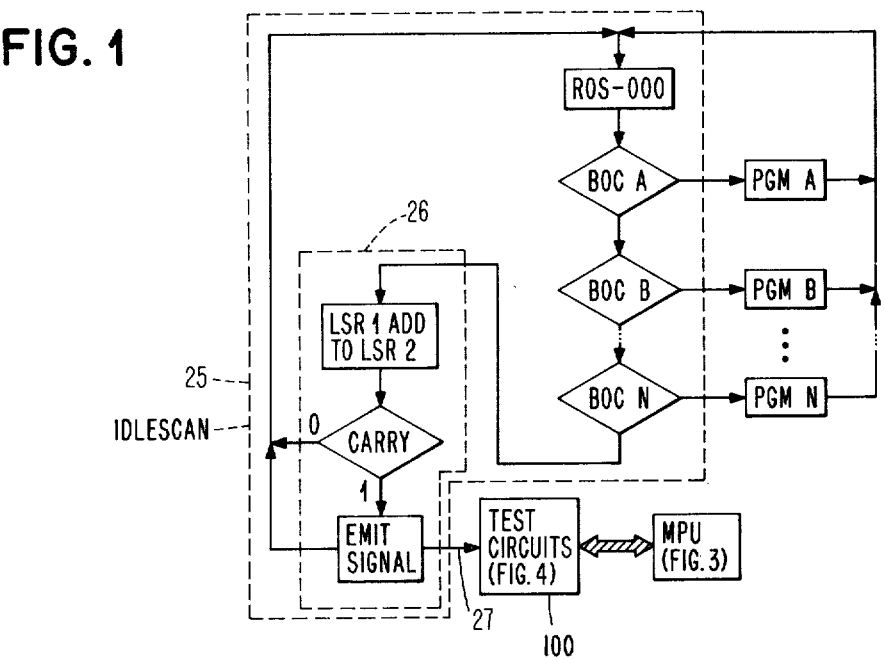
FIG. 1 is a simplified flow diagram illustrating some important aspects of the present invention.

This glossary provides a ready reference to the abbreviations repeatedly used in describing the invention.

| | |
|---|---|
| ADDR | Address |
| ADDRI | Address In (a command signal on INTFX indicating address signals appear on CBI) |
| ADDRO | Address Out (a command signal indicating address signals are being sent in bus out lines), special tag is SADDRO |
| ALU | Arithmetic-Logic Unit |
| A-O | AND and OR circuit building block |
| BKWD | Backward |
| BOC | Branch on Condition |
| BOR | Beginning of Record (remains active during entirety of record readback signal envelope) |
| BOT | Beginning of Tape |
| CBI | Channel Bus In (lines for carrying data signals from I/O controller to CPU) |
| CBO | Channel Bus Out (lines for carrying data and CMD signals to controller 11) |
| CHNL | Channel |
| CMD | Command (a set of control signals) |
| CMDO | Command Out (a control or tag signal telling controller 11 to change operation in accordance with predetermined criteria) |
| CMDSEQ | Command Sequence-operational status during first mode; also, a latch indicating first mode is active |
| COMP | Comparator circuits resulting from a command parity error |
| CPU | Central Processing Unit |
| C REG | Register buffering signals between a control panel and a memory |
| CTI | Channel Tag In (a tag signal supplied from an I/O controller to a data channel concerning the interpretation of signals supplied over CBI) |
| CTO | Channel Tag Out (a tag signal supplied from a data channel to an I/O controller interpreting signals supplied over CBO) |
| CU | Control Unit |
| CUB | Control Unit Busy (a tag signal) |
| EOT | End of Tape (a marker on a record tape) |
| EWA | Early Warning Area (a marker on a record tape indicating EOT marker is near) |
| EXECDEP | Execute DEPRIME (an entry point for an I/O device microprogram for initiating scanning for DEPRIMES) |
| FWD | Forward |
| IBG | Interblock Gap |
| IC | Instruction Counter |
| IDLEPEND | A wait routine for the channel micrprogram unit used to wait for further instructions from a data channel |
| IDLESCAN | A microprogram scanning for I/O status |
| IHS | Information Handling System |
| INSEL | Initial Selection (a control or tag signal signifying an attempted selection of an I/O controller; also, SINSEL is used) |
| INTFX | Interface X |
| INTFY | Interface Y |
| I/O | Input/Output |
| IR | Instruction Register |
| K | Counter |
| LSR | Local Store Registers (a memory system) |
| LSRM | LSR in test circuits 100 |
| M-CLOCK | Timing circuits which time test circuitry |
| MIS | Multiple Interface Switch |
| MOD | Modulus |
| MPU | Microprogrammable Unit |
| MPUX | Microprogrammable Unit No. X (used in connection with a data channel) |
| MPUY | Microprogrammable Unit No. Y (used in connection with an I/O device) |
| M REG | A register holding a multiplexing factor |
| MTU | Magnetic Tape Unit |
| NOP | No Operations (do-nothing command) |
| NRZI | Nonreturn to Zero-IBM (a recording scheme) |
| OP | Operation |
| OPIN | Operation In (a tag signal) |
| OSC | Oscillator |
| PE | Phase Encoding (a recording scheme) |
| REQIN | Request In (an inbound tag signal requesting attention of the CPU) |
| RES | Reserved |
| ROS | Read Only Store |
| RST | Reset |
| RTN | Return |
| S(TAG) | S followed by INSEL or other outbound tag signal signifying such tag signal was generated in test circuits rather than by CPU |
| STAG | Special Tag (any tag preceded by "S" is a STAG, for example, SINSEL is a special initial selecton tag signal) |
| STAT | Status |
| STS | Status |
| SUPPREQIN | Suppressible Request In (a tag signal) |
| SUPPRO | Suppress Out (a tag signal) |
| SVCI | Service In (a tag signal) |
| SVCO | Service Out (a tag signal) |
| TACH | Tachometer |
| TAG | A signal used for control/interpretation of signals on CBO (an outbound tag-TAGO) or CBI (an inbound tag-TAGI) |
| TAPE OP | Tape Operation (a status signal) |
| TIE | Track In Error |
| TIO | Test I/O |
| TM | Tape Mark |
| TU | Tape Unit, also MTU |
| TUADDR | Tape Unit Address Register |
| TUBI | Tape Unit Bus In |
| TUBO | Tape Unit Bus Out |
| TUTAG | Tape Unit Tag Register |

DETAILED DESCRIPTION

Figure 4:
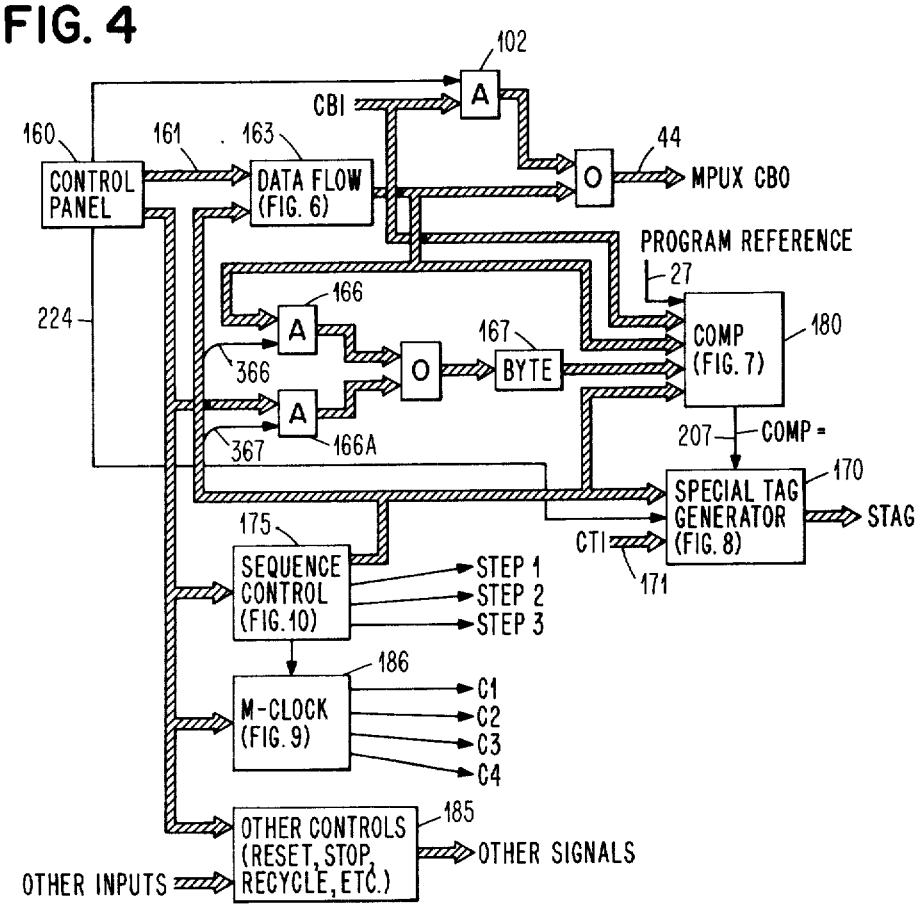
FIG. 4 is a greatly simplified block signal flow diagram of the maintenance section of the FIG. 2 illustrated system and which uses the present invention.

Referring first to FIG. 1, the broad aspects of one feature of the present invention are shown. This operation in combination with the FIG. 4 illustrated apparatus provides illustrative improved methods and preferred organizations of programmable machines in accordance with the present invention. In FIG. 1, dash line box 25 contains the illustration of a cyclable program loop for controlling the later-described microprogrammable I/O controller. At memory address ROS-000 (storage register selected by supplying address 000 to ROS 65), an instruction word branches machine operation into a cyclable program loop. The cyclable program loop includes A-N branch-on-condition operations which successively sense branch status signals within the controller for selectively referencing programs A-N. For instance, in branch-on-condition (BOC) operation A, if a predetermined status signal is sensed by the program, program A is instituted. Upon completion of program A, ROS address 000 is again accessed; and the loop is re-initiated. The same operation is performed for BOC-B through BOC-N. Alternately, program A may exit to BOC-B rather than to ROS=000. Also, additional program steps may be included in IDLESCAN 25.

According to the preferred form of the invention, the steps illustrated in dash line box 26 are inserted into the cyclable program loop. Such steps selectively effect a second mode of operation using the cyclable program loop for purposes other than referencing programs A-N. In such second mode of operation of the machine, such as a maintenance or diagnostic mode, the status signals are selectively suppressed such that none of the BOC's will refer to any of the programs. Rather, the cyclable program loop selectively recycles. In this manner, the cyclable program loop is a timing loop generating program timing reference signals for use during diagnostic or other procedures. Accordingly, the series of steps 26 is a program counter for determining the number of repetitions of loop 25 to be executed before supplying a program reference signal at 27. The signal program reference actuates the FIG. 4 illustrated test circuits for operating a microprocessing unit shown in FIG. 3 in such second mode.

Figure 2:
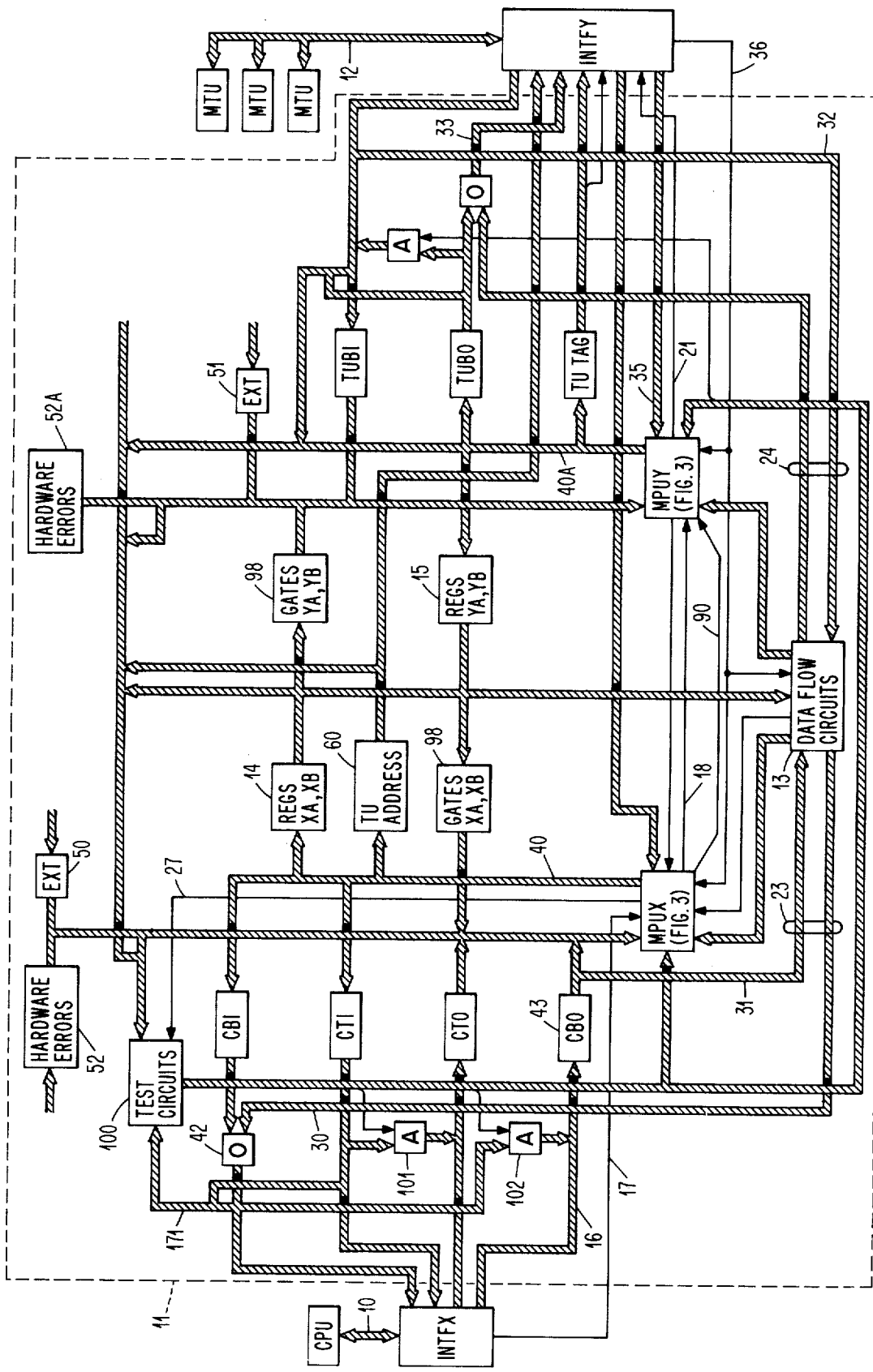
FIG. 2 is a simplified system diagram in which the invention has important applications.

In such microprogrammable unit, local store (LSR) 75 (FIG. 3) has a set of program-assigned registers related to steps 26. For example, local storage register (LSR) addressed register 001 in LSR 75 contains a constant, while LSR addressed register 002 contains a cumulative count or sum used to determine the periodicity of the program reference signal. Within steps 26, for each repetition of the programmable loop 25, the contents of LSR 001 (storage register in LSR having address 001) are added to the contents of LSR 002. The BOC in 26 determines whether or not a carry signal (not shown) has been emitted from ALU 72. If no carry has been emitted, the cyclable program loop is re-entered at ROS-000. Whenever a carry is sensed, the signal at 27 is emitted, LSR 002 cleared to 0's, and the cycle re-initiated. In a preferred form of the invention, the contents of LSR 001 would be a binary 1. For shorter loops, the contents can be altered in accordance with the description of FIG. 4. The test circuits shown in FIG. 4 respond to the program reference signal emitted at 27 by the cyclable microprogram loop in differing ways to effect different machine operations within the FIG. 2 illustrated subsystem, as well as within the microprocessing unit.

Accordingly, it is seen that cyclable program loop 25, during a first mode of operation, is used to selectively access one of a plurality of object programs which may be used in normal data processing operations. In a second mode of operation, which may be imposed upon the machine via a control panel, the cyclable program loop is used in an entirely different manner to generate a program reference signal at 27. Circuit means within the programmable machine are responsive to the reference signal emitted by the program loop to perform functions entirely unrelated to the cyclable loop functions during the first mode.

A first mode of operation relating to tape subsystems is more completely described in the related patent application, which is incorporated by reference into the present description. FIG. 1 of the present application corresponds with FIG. 8 of the referenced Irwin application which shows a so-called IDLESCAN routine. The present application modifies and adds routine 26 to the Irwin IDLESCAN 25 for effecting two uses of the referenced routine. Note the program connections in the present application do not go to IDLEPEND as shown in the referenced Irwin application.

General Description of Tape Subsystem (TSS)

Figure 3:
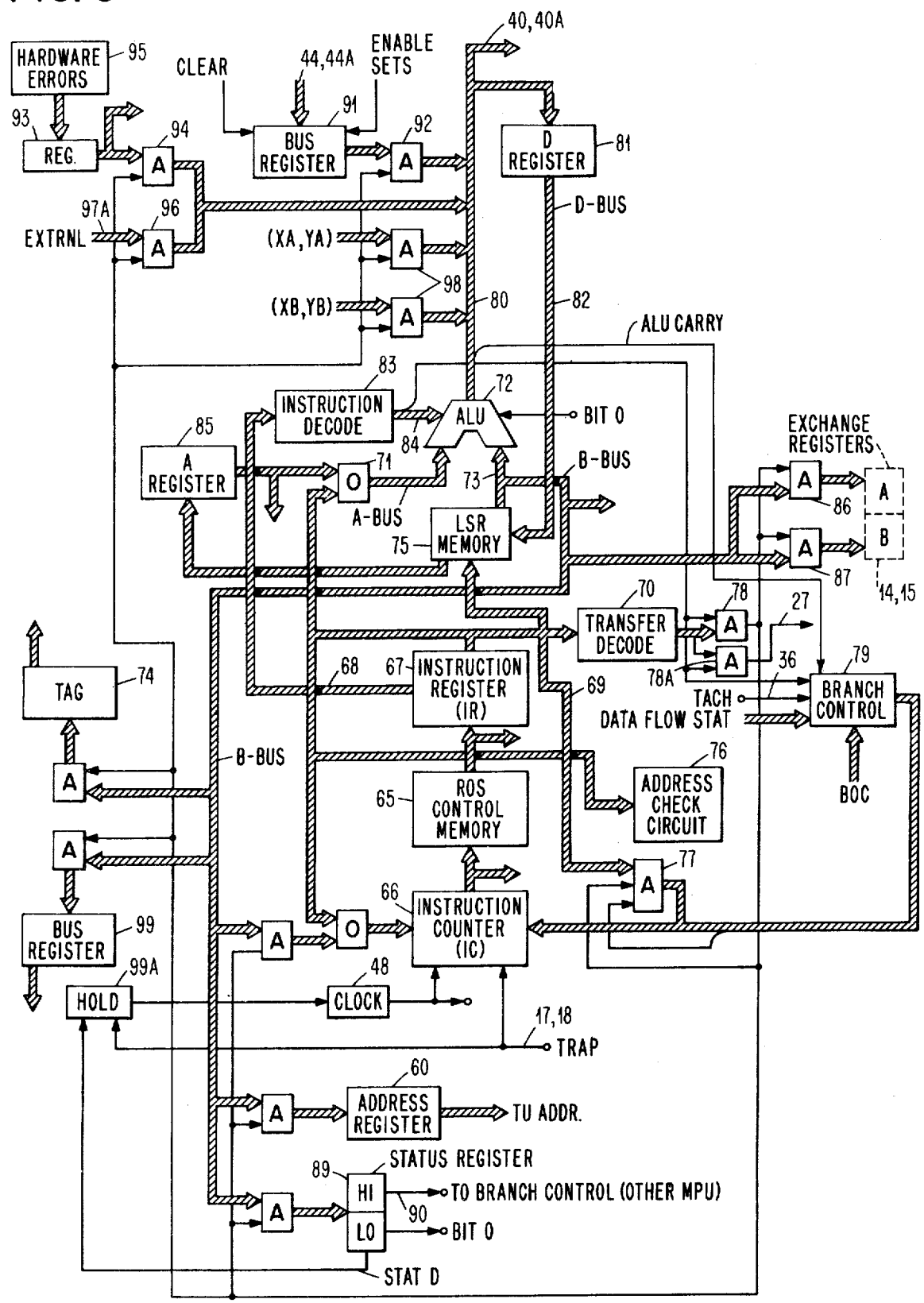
FIG. 3 is a simplified diagram of a microprocessing unit usable in the FIG. 2 illustrated system.

The environment in which the preferred illustrated form of the invention was first practiced is now described. I/0 controller 11 is particularly useful with the type of channel described in the Moyer et al. U.S. Pat. No. 3,303,476. The description assumes a channel I/O controller interface usable with a channel of the type described in that patent. FIGS. 1 and 3 of that patent describe tag signals used herein except SUPPRESSIBLE REQUEST IN which is a signal which may be ignored (suppressed) and supplied by controller 11 requesting the channel initiate an initial selection procedure. The description also assumes that the interface between the controller and the I/O devices follows a similar bus-out, bus-in, and tag line arrangement. In addition to the functions described in the Moyer et al patent supra, a tachometer input line is provided to I/O controller 11, as later described. Information handling system (IHS) interface X (INTFX) is the interface described in the Moyer et al patent.

INTFX communicates with CPU via cable 10. The term CPU is hereafter used to include the channel portions of data processors. I/O controller 11 provides control for exchanging information-bearing signals, inter alia, in phase-encoding (PE) and NRZI schemes.

I/O controller 11 has three main sections. MPUX is a microprogrammable unit providing synchronization and control functions between the I/O controller and INTFX. The FIG. 1 illustrated programs reside in MPUX. MPUX performs similar functions with interface Y (INTFY). In the preferred form, MPUY cooperates with MPUX as described by Irwin, supra. In a magnetic tape subsystem, MPUY provides motion control and other operational related functions uniquely associated with the described I/O device. The third controller section is data flow circuits 13, which actually process information-bearing signals between interfaces X and Y. Data flow circuits 13 may consist of entirely a hardware set of sequences and circuits for performing information-bearing signal exchange operations. In an I/O controller associated with a magnetic tape recording system, such data flow circuits include writing circuits for both PE and NRZI, readback circuits for both encoding schemes, deskewing operations, certain diagnostic functions, and some logging operations associated with operating a magnetic tape subsystem.

Since MPUX and MPUY are independently operable, each having its own programs of micro-instructions, program synchronization and coordination is required. To this end, exchange register networks 14 and 15 are provided. These registers receive output signals from the respective MPU's. The signals temporarily stored in these registers are supplied directly to data flow circuits 13 for effecting and supervising data flow and signal processing operations. This arrangement makes the data flow circuits 13 subservient to both MPUX and MPUY. Additionally, such signals are simultaneously provided to the other MPU; that is, registers 15 supply MPUY output signals to MPUX and registers 14 supply the MPUX output signals to MPUY. The respective MPU's under microprogram control selectively receive such signals for program coordination.

INTFX is a controlling interface. It not only exchanges control signals with MPUX (CTO, CTI, CBO, CBI), but also has trap control line 17. When this line is actuated, MPUX aborts all present operations and branches to a fixed address for analyzing signals on CBO cable 16. These signals force MPUX to perform INTFX commanded functions. In a similar manner, MPUX has trap control line 18 extending to MPUY. MPUY responds to an actuating signal on line 18 from MPUX in the same manner that MPUX responds to a trap signal on line 17. MPUY, in addition to exchanging control signals with devices via INTFY, also has trap line 21 for controlling an I/O device in a similar manner. All information-bearing signals are exchanged between interfaces X and Y through data flow circuits 13 via full-duplex cables 23 and 24.

Data flow circuits 13 have channel bus in (CBI) lines 30 and channel bus out (CBO) lines 31. Each set of lines has a capability of transferring one byte of data plus parity. Similarly, tape unit bus in (TUBI) lines 32 transfer signals to data flow circuits 13 and MPUY over INTFY. Tape unit bus out (TUBO) lines 33 carry information-bearing signals for recording in MTU's plus commands from MPUY and MTU addresses from MPUX. Status signals are supplied both to MPUX and MPUY over status cables 34 and 35. Velocity or tachometer signals supplied by the selected and actuated MTU are received over line 36 by MPUX, MPUY, and data flow circuits 13.

MPUX has output bus 40 (also termed B bus) supplying signals to its exchange registers 14. Output bus 40 is also connected to the channel exchanging registers channel tag in (CTI) and CBI. CTI transfers the tag signals from I/O controller 11 to CPU as described in the Moyer et al patent among other control signals for interfacing operations.

Additionally, CBO 43 receives bytes of data from INTFX for data flow circuits 13 and for MPUX. Gates XA and XB gate exchange signals from the MPUY exchange registers 15. Gates XA and XB respectively receive the control signals from registers YA and YB. The CBI lines over INTFX are multiplexed by OR circuits 42. CTI supplies tag signals indicating what CBI signals mean.

INTFY operates in a similar manner. Signals in TUBO register output lines 33 are interpreted by the MTU's in accordance with the signals in TUTAG (tape unit tag) register.

External signals are supplied to MPUX and MPUY via external registers 50 and 51, respectively. Such external signals may be from another I/O controller, from a separate maintenance panel, communication network, and the like. Also, hardware detected errors are lodged in registers 52 and 52A for sampling by MPUX and MPUY.

I/O controller 11 has an efficient initial selection process. MPUX responds to INTFX request for service of an MTU to provide the MTU address over output line 40 into TU (tape unit) address register 60. INTFY transfers the TU address to all MTU's. The appropriately addressed MTU responds to MPUY that the selection is permissible or not permissible. If permissible, a connection is made; MPUY notifies MPUX via register YA. MPUX then completes the initial selection by responding to INTFX via CTI. Data processing operations then can ensue.

Microprogrammable Units (MPU's)

The MPU's contain microprograms which determine the logic of operation of I/O controller 11. MPUX contains a set of microprograms in its control memory designed to provide responsiveness and data transfers with INTFX. In a similar manner, MPUY contains a set of microprograms for operation through INTFY with the various MTU's. Such programs are described in the aforementioned commonly assigned and copending patent application of John W. Irwin, Ser. No. 77,088, filed Oct. 1, 1970. Registers 14 and 15 contain signals from the respective microprograms which serve as inputs to the respective programs for coordinating and synchronizing execution of various functions being performed. A better understanding of how the microprograms operate the hardware is attained by first understanding the logic construction of the MPU's which, in the illustrative embodiment, are constructed in an identical manner.

Referring more particularly to FIG. 3, an MPU usable in I/O controller 11 is described in a simplified block diagram form. The microprograms are contained in ROS control memory 65. The construction and accessing of such memories are well known. A preferred form of read-only store, no limitation thereto intended, is the so-called capacitor read-only store or memory such as shown in U.S. Pat. Nos. 3,397,393, 3,506,969, and 3,371,323. Other types of read-only stores may be used, such as shown in U.S. Pat. Nos. 3,246,315, 3,187,309, and 3,248,710. Also see U.S. Pat. No. 3,576,982 for an error-tolerant read-only store. The ROS output signal word, which is the instruction word, is located by the contents of instruction counter (IC) 66. IC 66 may be incremented or decremented for each cycle of operation of MPU. By inserting a new set of numbers in IC 66, an instruction branch operation is effected. The instruction word from ROS 65 is supplied to instruction register (IR) 67 which staticizes the signals for about one cycle of MPU operation. The staticized signals are supplied over cables 68 and 69 to various units in MPU. Cable 68 carries signals representative of control portions of the instruction word, such as the operation code and the like. Signals in cable 69 are selectively supplied to IC 66 for effecting branching and instruction address modifications. Cable 69 also carries signals representative of data addresses. These are supplied to transfer decode circuits 70 which respond to the signals for controlling various transfer gates within MPU and the generation of the program reference signal. The other portions of the signals are supplied through OR circuits 71 to ALU 72. In ALU 72, such signals may be merged or arithmetically combined with signals received over B bus 73 for indexing or other data processing operations. MPU has LSR 75 accessible in accordance with the address signals carried over cable 69. Address check circuit 76 verifies parity of the address. The address signals may also be used in branch operations. AND circuits 77 are responsive to transfer decode signals supplied from circuit 70 through AND circuits 78 to transfer the address signals in an instruction word to IC 66. Such transfer may be under direct control of the operation portion of the instruction word as determined by transfer decode circuits 70 or may be a BOC as determined by branch control circuits 79 which selectively open AND circuits 77 in accordance with the conditions supplied thereto.

The data flow and arithmetic processing properties of the MPU center around ALU 72. ALU 72 has two inputs, the A bus from OR circuits 71 and B bus 73. ALU 72 supplies output signals over cable 80 to D register 81. D register 81 supplies staticized signals over D bus 82 to LSR 75. Instruction decode circuits 83 receive operation codes from IR 67 and supply decoded control signals over cable 84 to ALU 72 and to AND circuits 78 for selectively transferring signals within MPU.

ALU 72 has a limited repertoire of operations. Instruction decode 83 decodes four bits from the instruction word to provide 16 possible operations. These operations are set forth in the Instruction Word List below:

| Op Code | Mnemonic | Instruction Word List<br>Function |
|---|---|---|
| 0 | STO | Store Constant in LSR, A set to 0 |
| 1 | STOH | Store Constant in LSR, Indexed Addressing |
| 2 | BCL | Match with Field 1, Branch to Addr in Field 2 |
| 3 | BCH | Match with Field 1, Branch to Addr in Field 2 |
| 4 | XFR | Contents of one selected LSR location is transferred to selected register or selected input is gated to one selected LSR location |
| 5 | XFRH | See XFR above plus indexed addressing |
| 6 | BU | Branch to 12-bit ROS address in instruction word |
| 7 | 00 | Not used - illegal code |
| 8 | ORI | A OR'd with B, result stored in LSR 75 |
| 9 | ORM | A OR'd with B, result not stored |
| A | ADD | A plus B, sum stored in LSR 75 |
| B | ADDM | A plus B, sum not stored |
| C | AND | A ANDed with B, result to LSR 75 |
| D | ANDM | A ANDed with B, result not stored |
| E | XO | A Exclusive OR B, result to LSR 75 |
| F | XOM | A Exclusive OR B, result not stored |

In the above list, the letter "A" means A register 85, "B" is the B bus, and the mnemonics are for programming purposes. The term "selected input" indicates the hardware input gates (92, 94, 96, 98) to the ALU output bus 80. The term "selected register" indicates one of the "hardware" registers in MPU. These include the interconnect registers 14 and 15 (FIG. 2), tag register 74, bus register 99, address register 60, and IC 66. Note that transfers from LSR 75 to these selected registers is via B bus 73. In FIG. 2, the B bus for MPUX corresponds to cable 40, while the MPUY B bus is cable 40A. Registers 14 receive signals from MPUX via AND circuits 86 and 87. In MPUY, AND circuits 86 and 87 supply signals to exchange registers 15. Branch control 79 in FIG. 3 is the MPU internal branch control. Tag register 74 in FIG. 3 for MPUX corresponds to CTI register. For MPUY, it corresponds to TUTAG register connected to INTFY. In a similar manner, bus register 99 for MPUX is register CBI, while in MPUY it is register TUBO (tape unit bus out). Address register 60 of FIG. 3 corresponds to TU address register 60 of FIG. 2. MPUY address register 60 is not used.

Status register 89 has several output connections from the respective MPU's. It is divided into a high- and low-order portion. The high-order portion has STAT (status) bits 0–3, while the low-order portion has STAT bit 0 plus STAT bits 4–7 (referred to as STAT A through STAT D, respectively). The low-order portion is supplied to the branch control 79 of the other MPU's. The bits 0 and 4–7 are supplied to data flow circuits 13 for controlling same. Bit 7 additionally is supplied directly to MPUY as indicated by lines 90 in FIG. 2. Interpretation of the STAT bits is microprogram determined.

The signal-receiving portions of each MPU are in four categories. First, bus register 91 is designed to receive tags and data bytes for MPUX; this corresponds to CBO register of FIG. 2. MPUY bus register 91 is TUBI register. AND circuits 92 are responsive to the transfer decode signals from circuits 70 to selectively gate bus register 91 to D register 81. From thence, the data bytes are supplied to LSR 75. Secondly, D register 81 also receives inputs from hardware error register 93 via AND circuits 94. Hardware error signals (parity errors, etc.) are generated in circuit 95 in accordance with known techniques. Thirdly, AND circuits 96 receive external data signals over cable 97A for supplying same to D register 81 under microprogram control. Fourthly, interchange registers 14 or 15 supply signals to AND circuits 98 which selectively gate the interchange signals to D register 81 under microprogam control. The receiving microprogram controls the reception of interchange signals from the other MPU.

Generally, the outgoing signals from each MPU are supplied via B bus 73, also a main input bus to ALU 72. The signal-receiving bus is the D bus, which is the input bus for LSR 75 and the output bus for ALU 72.

Since ALU 72 has a limited repertoire of operations, many of the operations performed are simple transfer operations without arithmetic functions being performed. For example, for OP code 4, which is a transfer instruction, the contents of the addressed LSR are transferred to a selected register. This selected register may be A register 85 in addition to the output registers. To add two numbers together in ALU 72, a transfer is first made to A register 85. The next addressed LSR is supplied to the B bus and added to the A register contents with the result being stored in D register 81. At the completion of the ADD cycle, the contents or results of D register 81 are stored in LSR 75. If it is desired to output the results of the arithmetic operation, then another cycle is used to transfer the results from LSR 75 over B bus 73 to a selected output register such as one of the interchange registers or bus register 99.

In FIG. 3, the cable 80 input to D register 81 corresponds respectively to either cable 44 or 44A of FIG. 2. Hardware error circuit 95 and error register 93 of FIG. 3 correspond both to the hardware error circuits 52 and 52A of FIG. 2. External cables 97A receive signals from the external registers 50 and 51 respectively for the two MPU's.

AND circuits 98 of FIG. 3 correspond to the gates XA, XB, and YA, YB of FIG. 2.

Each MPU is trapped to a predetermined routine by a signal on trap line 17 or 18, respectively. The trap signal forces IC 66 to all zeroes. At ROS address 000, the instruction word initiates a so-called X-trap routine or Y-trap routine rather than entering IDLESCAN 25 of FIG. 1. These routines are described in the copending Irwin application, supra. For reliability purposes, it is desirable to force MPUY to inactivity. This means that clock oscillator 48 is gated to an inactive state. During normal operations, clock 48 supplies timing pulses to advance IC 66 and coordinate operations of the various MPU's as is well known. Whenever MPUY has finished its operations, it sets STAT D in register 89. STAT D indicates MPUY has finished its operations as requested by MPUX. The STAT D signal sets hold latch 99A indicating that MPUY is inactive. Hold latch 99A gates clock 48 to the inactive condition. When MPUX traps MPUY, not only is IC 66 preset to all zeroes, but hold latch 99A is reset. Clock 48 is then enabled for operating MPUY.

From the above description of MPU's and FIG. 1, in a first mode of operation, MPUX during its IDLESCAN routine 25 fetches one of a pluraity of programs as described in the above-referenced Irwin application.

Routine 26 of IDLESCAN 25, in a second mode of operation, generates the program reference signal on line 27. In FIG. 3, transfer decode 70 is responsive to the instruction emit signal set forth in conjunction with the instruction decode transfer (OP = 4; Instruction Word List) supplied from decoder 83 to emit an electrical signal on line 27. Line 27 is connected in MPUX (not connected in MPUY) to test circuits 100 (FIG. 2) and further described with respect to FIG. 4. In this second mode, the program reference electrical signal or pulse on line 27 is used as a timing reference within test circuits 100. The program reference signal is generated by AND circuit 78A being jointly responsive to a decoded signal from transfer decode 70 and the instruction decode 83 signal indicating a transfer operation (OP = 4).

Second Mode of Operation

In the preferred mode of implementation, the second mode of operation is interleaved with the first mode of operation. Such interleaving is particularly useful when the peripheral subsystem has been set up for a maintenance procedure; that is, the peripheral subsystem is disconnected from CPU and is under control of test circuits 100. In this application of the invention, the second mode selectively provides delays between channel command sequences (first mode) to be executed by the peripheral subsystem. Such delays enable the machine to simulate reinstruct times and control magnetic media motion for generating malfunctions or errors in a marginally operating subsystem. For example, by varying the delays, the tape can be caused to come to a complete stop between successive commands from test circuits 100 for varying periods of time. In the alternative, the delays may be sufficiently short that the tape never rests. By selectively making sequences of commands or tape operations intermingled with the delays, various operational conditions can be exaggerated.

In this application of the invention, the delays are provided by the cyclable program loop emitting the program reference signal to test circuits 100. Test circuits 100 accumulate a number of program reference signals for determining the duration of the delay. Upon expiration of such delay, the second mode is terminated and the cyclable program loop is then used during the first mode. Upon completion of the operation commanded from test circuits 100, the first mode is terminated; and a second delay in the second mode is initiated. This procedure is repeated in a closed operational loop for diagnosing subsystem operation. Such closed loop maintains a tight timing control over all operations, thereby facilitating diagnosing procedures.

Each command sequence (CMDSEQ) in the preferred mode includes an initial delay provided during second mode of operation followed by execution of a channel command furnished by test circuits 100. Timing relationships, fetching of commands, and execution of same are illustrated by the idealized waveforms of FIG. 5 and fully explained with respect to FIGS. 4 et seq. Such command sequences follow the design philosophy described in the Moyer et al. U.S. Pat. No. 3,303,476 and the Beausoliel et al. Pat. No. 3,336,582, a difference being that the test circuits 100 provide the tag out signals rather than a separate controlling unit.

The below flowchart illustrates one maintenance loop using the present invention with respect to analyzing performance of a magnetic tape during a write, backspace, and read operation. All delays are equal.

| | |
|---|---|
| CMDSEQ 1 | Delay.<br>Write record.<br>COMMENT: The delay is determined jointly by the number of program reference signals compared with a number stored in test circuits 100. The length of the record being recorded or written is determined by a number inserted into test circuits 100 by maintenance personnel. MPUX generates what is termed a "ripple-write pattern". This numerical pattern is supplied to test circuits 100 over CBO. MPUX supplies the ripple-write numerical data over CBI, thence to CBO. |
| CMDSEQ 2 | Delay.<br>BSR.<br>COMMENT: The delay in CMDSEQ 2 either permits the tape to come to a complete stop or requires reversal of tape without stopping. BSR (backspace record) moves the tape such that the read gap is upstream from the record just written in preparation for the read operation in CMDSEQ 3. |
| CMDSEQ 3 | Delay.<br>Read record.<br>COMMENT: Again, the delay in CMDSEQ 3 either permits the tape to stop or to be immediately reversed after BSR. The read record command moves the tape in the forward direction and stops it upon completion of the read in a usual manner. |
| CMDSEQ 4 | Delay.<br>NOP.<br>COMMENT: NOP is a no operation command. Accordingly, the timing delay between CMDSEQ 3 and CMDSEQ 1 is equal to twice the constant delay programmed by test circuits 100. Such variations in delay can effect different results from testing the MPU. |

The above-described flowchart is repeated until maintenance personnel depress the stop button for stopping test circuits 100.

Each CMDSEQ in the flowchart goes through the sequence of operations illustrated in FIG. 5 and fully described with respect to FIGS. 4 et seq.

Test Circuits 100

Test circuits 100, shown in simplified form in FIG. 4, are responsive to the line 27 program reference signal and other signals to sequence I/O controller 11 during diagnostic mode. These circuits also store manually entered channel commands and generate signals simulating CPU initiated operations such that I/O controller 11 maybe fully exercised without employing a CPU. Circuits 100 effect the above-described interleaved timing and program selection. The MTU's connected through INTFY may or may not be active. For diagnostic purposes, sets of AND circuits 101 and 102 provide selective electrical "wrap-around" electrical connections from CTI to CTO (channel tag out) and from CBI to CBO. These wrap-around connections enable test circuit 100 generated signals to selectively replace signals normally received from INTFX.

Control panel and display 160 may be constructed as an operator's panel or as a maintenance panel in known data processing equipment and microprogrammable units. Such panels and displays have sets of indicator lights associated with predetermined registers either permanently or selectively via manually actuated switches. Additionally, sets of rotary switches are provided for data byte generation and memory address generation as is found on present-day System/360 computers manufactured by International Business Machines Corporation. Clock control switches and the like and sequence selectors are also inserted on the panel. Such switches and their arrangement are not pertinent to the practice of the present invention and can be inferred based upon the reading of the following description with respect to FIGS. 5 et seq.

Figure 6:
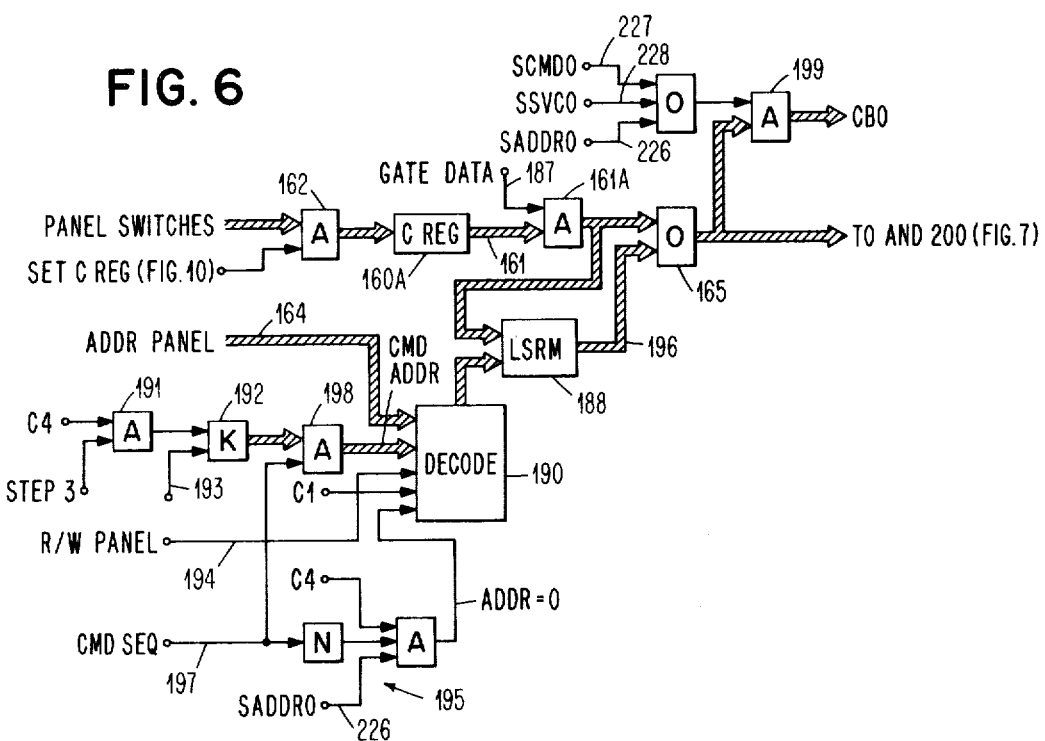
FIG. 6 is a simplified flow diagram of the data flow portion of the FIG. 4 illustrated apparatus.

Control panel 160 switches generate data signals representing "channel commands" normally received over INTFX by MPUX as well as other control signals. Cable 161 transfers these signals to special data flow circuits 163 (FIG. 6). Special data flow 163 has a local storage memory (LSRM) for memorizing these manually inserted channel commands and data words. Sequence control 175 selectively actuates AND circuits 166 or 166A to load byte count register 167 with signals from data flow 163. Register 167 stores the length of the second mode operations as timed by the program reference signal. Data flow 163 also supplies its channel signals through an OR circuit to cable 44 (CBO).

Test circuits 100 control timing delays by comparing the number of received program reference signals over line 27 with the number stored in byte register 167. To terminate the timing or delay period, comparator 180 is jointly responsive to byte counter 167 and to signals from CBI to provide an equality compare (COMP=) signal over line 207 to special tag generator circuits 170. COMP= signifies the end of the delay period. Controller 11 circuits are then activated as tag generator 170 responds to COMP= and to the CTI signals received over cable 171 and to signals from test circuit sequence control 175 to generate special tags simulating INTFX tag signals requiring responses from MPUX. Such special tags (STAG) are used within test circuits 100 to sequence MPUX in the same manner as CPU. Additionally, other controls 185 are jointly responsive to signals from MPUX, MPUY, panel 160, and sequence control 175 to reset the controller circuits, stop the operation of the subsystem, or initiate or display other controller functions used for diagnostic purposes but not related to the present invention.

Figure 9:
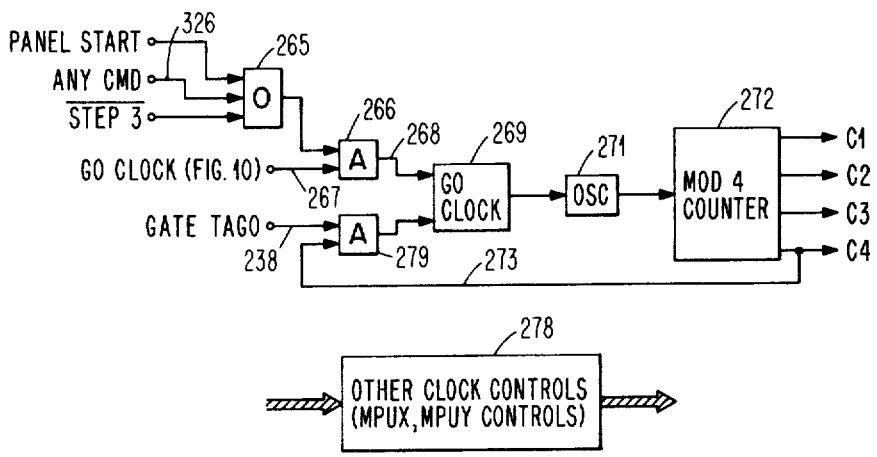
FIG. 9 is a simplified showing of the M-clock used in the FIG. 4 illustrated apparatus.

M-clock 186 times diagnostic procedures by timing signals C1, C2, C3, and C4. Generation of these signals along with other stepping signals in sequence control 175 is described in greater detail with respect to FIGS. 9 and 10.

The cyclable program loop generated program reference signal on line 27, described with respect to FIG. 1, is received by comparator 180 for generating ripple patterns, timing sequences, and the like, within test circuits 100. The program reference signal establishes program generated check points in test circuits 100. The use of such signal in a second mode of operation is described using a so-called ripple-write operation for testing the recording and readback circuits in the tape subsystem. Each ripple-write cycle records all binary permutations of eight bits plus parity in a nine-track system. The number of such cycles is selected via panel 160 as will become apparent.

The program reference signals received over line 27 have a certain constant periodicity in accordance with the number of instructions executed in IDLESCAN loop 25. These program reference signals repeatedly gate the compare signal over line 207. As will become apparent, M-clock 186 signals are combined with the program reference signals in order to provide synchronization at the circuit level.

In the ripple-write function, the special tags out (STAGO) from generator 170 are supplied to CTI and thence to MPUX. MPUX is controlled to generate a changing data pattern, i.e., ripple pattern, on CBI. For recording the ripple pattern, CBI is gated to CBO, thence through data flow circuits 13 (FIG. 2), and over cable 33 through INTFY to the selected or addressed MTU.

Second Mode Sequences (FIGS. 4 and 5)

In the preferred arrangement, the second mode is from panel 160 by throwing a manual switch which generates a second mode enabling signal for line 224. The enabling signal selectively activates circuits within test circuits 100 for the second mode of operation. The enabling signal is primarily used within sequence control 175 and STAG generator 170. Once the mode has been enabled, data signals, command signals, and the like, are entered into the data flow LSRM via manual switches, as will become apparent with respect to the description of FIG. 6. Once the sequence of commands has been established, i.e., those signals are stored in data flow 163, they are then sequentially fetched using the timing shown in FIG. 5 for simulating INTFX operation.

Figure 10:
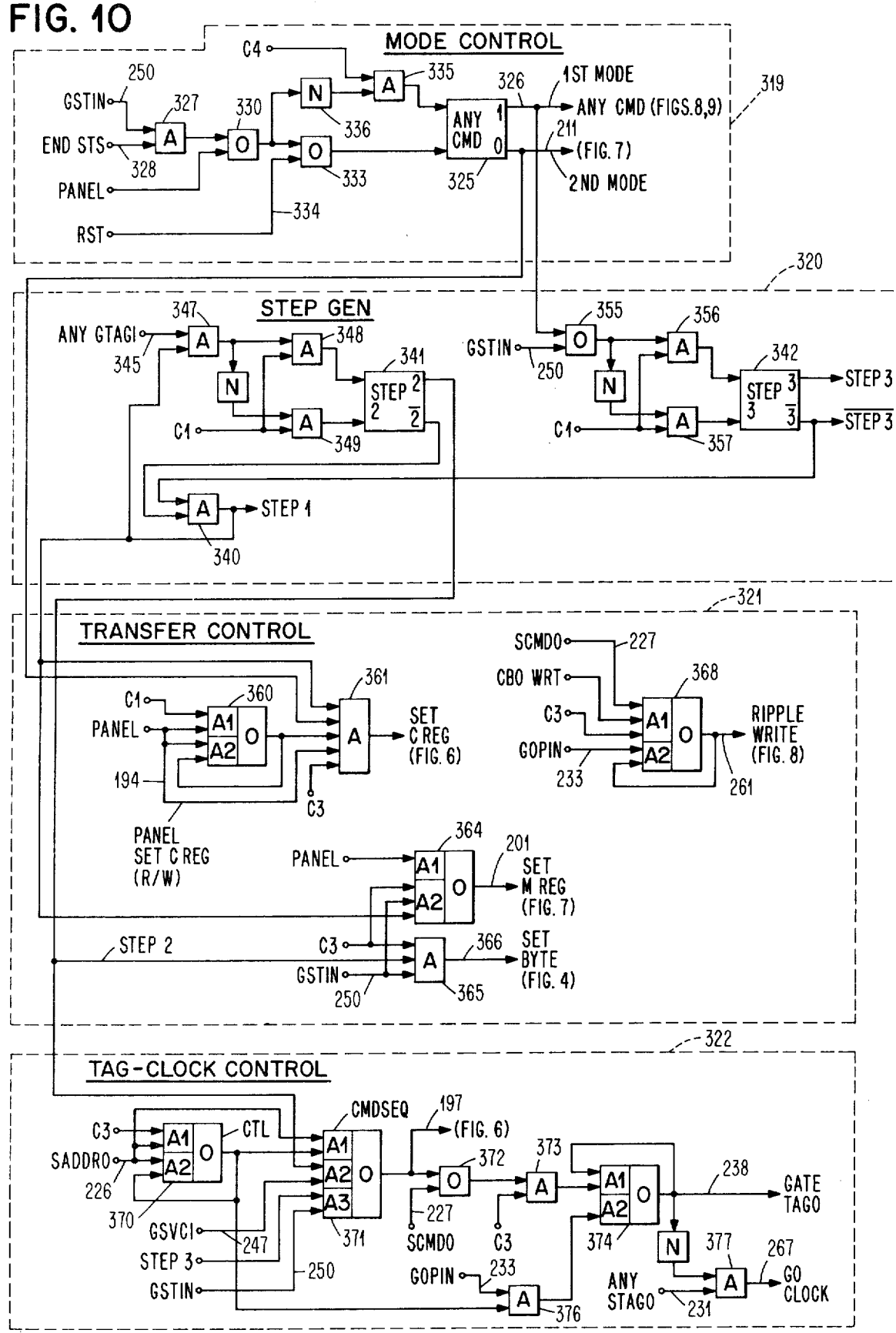
FIG. 10 is a simplified and partial showing of the sequence control used to sequence operations of the FIG. 4 illustrated apparatus.

Actuation of a start button in panel 160 causes step 1 to be emitted from sequence control 175 and enables M-clock 186 to issue four clock pulses, C1-C4. In FIG. 5, the LSRM line identifies the data signals fetched during each access. With CMDSEQ signal 172 off, test circuits 100 fetch a first byte from LSRM and supply same to comparator 180. This number denotes a predetermined delay from initiation of operation by the start button until the SINSEL (special initial selection) is issued as at 173. SINSEL initiates a CMDSEQ determined by the command stored in data flow 163. The delay is determined by counting a number of program reference signals indicated by the number fetched from data flow circuits 163. The gating within test circuits 100 is provided by the later-described CMDSEQ latch in sequence control 175 (FIG. 10). Upon completion of the first-occurring step 1, CMDSEQ is set to the active condition thereby enabling a command to be read into I/O controller from data flow 163. Tag generator 170 is supplying SADDRO (special address out) simulating that an initial selection is to be performed. SADDRO is ANDed with SINSEL to initiate transfer of a device address from data flow 163 to I/O controller 11.

The second step 1 is performed when CMDSEQ latch is in the active condition. The first byte obtained from data flow 163 is the device address. Suitable gating circuits transfer the number to MPUX for transfer by microprogram control to address register 60 (FIG. 3). At the end of clock time C3, with CMDSEQ active, M-clock 186 is stopped. Test circuits 100 then await issuance of SINSEL as determined by the initial delay fetched during the initial step 1. As soon as SINSEL is active, STAG generator 170 issues a special command out (SCMDO) indicating the next byte of data read from data flow 163 indicates the command to be performed by I/O controller 11. These command signals are gated to CBO and received by MPUX. MPUX interprets SCMDO gated signals in the same manner as a command signal (CMDO is active) received in a CCW from CPU. Notice that address in (ADDRI) is supplied over CTI by MPUX in response to SADDRO. This confirms the receipt of the device address previously mentioned. CTI is wrapped to CTO, thence informs circuits 100 to proceed.

Subsequently, MPUX supplies a status in (STIN) signal in response to SCMDO indicating receipt of the command signals over CBO. Acknowledgement of the STIN for normal status is all 0's on CBI. Then, circuits 100 supply special service out (SSVCO).

In fetching the command signal from data flow 163, a step 2 signal from sequence control 175 indicates that a command signal is being fetched. In FIG. 5, note the unique sequence of tags SCMDO, ADDRI, and step 2.

In response to STIN, test circuits 100 fetch byte counts for the CMDSEQ during three steps, 1, 2, and 3 during three successive M-clock 186 cycles. During step 1, with STIN active, the byte count is loaded into a multiplying REG in the comparator 180. The multiplying REG in a CMDSEQ (first mode) multiplies the number of times a ripple-write, for example, must be repeated before the write operation pursuant to the command has been performed. For example, if four repetitions are desired, then the number 4 is loaded into the multiplying register during step 1 when STIN is active. Durings steps 2 and 3, byte count register 167 is loaded with the maximum number of bytes to be transferred in a given ripple-write operation. CBI receives from MPU the number of bytes that have been written, and this number is compared with the number in 167 by comparator 180.

When the same data pattern is to be repeatedly recorded on the tape, the steps 1 and 2 occurring during perform commands SVCO and SVCI transfer such numbers to MPUX via CBO. Since this is not used in the illustrative embodiment, it is not further described. The other SVCO and SVCI signals perform command transfer data signals from MPUX through CBI, hence, CBO to the circuits for recording in the addressed MTU. When the CBI count equals the byte count in register 167 as modified by the multiplying factor, special tag generator 170 issues an SCMDO terminating the ripple-write operation. It responds by an STIN which is the ending status of the commanded operation. Test circuits respond to the STIN with an SSVCO. At this time, the addressed MTU is stopped and the second mode reinitiated by the first step 1 in FIG. 5. This sequence is repeated automatically until a stop button (not shown) in panel 160 is activated. Alternately, test circuits may be set up to stop on error, stop on BOT, EOT, or EWA, and the like.

Special Data Flow Circuits

Referring next to FIG. 6, the special data flow portion of the test circuits is briefly described. Panel-generated data, i.e., setting switches, is stored in C register (C REG) 160A, thence is supplied over cable 161 to AND circuits 161A. Control line 187, also from panel 160, selectively opens AND circuits 161A to pass data signals to LSRM memory 188. LSRM may be constructed in the same manner as LSR 75 in MPUX and MPUY. Panel 160 addresses LSRM via switch generated signals supplied over cable 164 which are decoded in decoder 190 and clocked into LSRM by clock signal C1. Gating decoders are well known and not further described for that reason. SET C REG signal times the signal transfer from panel 160 to register 160A. Sequence control 175 generates SET C REG as will be described.

LSRM alternately supplies delay counts for the second mode and control and command signals for the first mode. The delay count for all second mode operations is stored in address 0 of LSRM. This latter address is accessed each time SADDRO is active and CMDSEQ signal (line 197) is inactive. Circuits 195 make this logic determination. Clock signal C4 transfers the logic decision of circuits 195 to decode 190 forcing address 0 to be accessed.

Fetching command and control signals is activated whenever CMDSEQ is active. This fetching corresponds to signal 172 of FIG. 5 being active. The CMDSEQ registers in LSRM are sequentially accessed.

Figure 7:
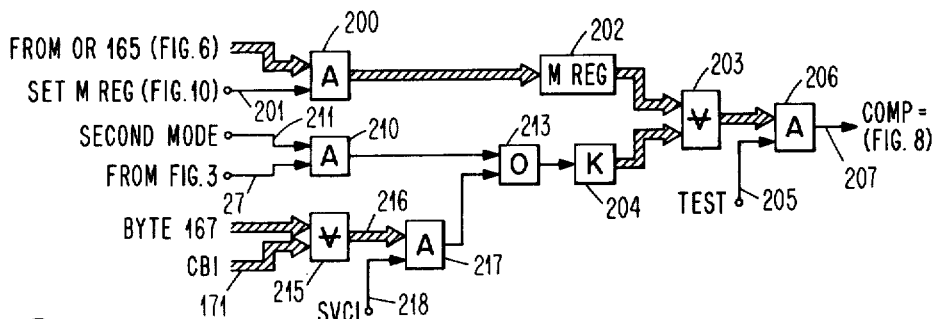
FIG. 7 is a simplified showing of the comparison circuits usable in the FIG. 4 illustrated apparatus.

Counter 192 sequences decoder 190 through command register groups 1 through 4 to effect the CMDSEQ's set forth in the flowchart. Start button actuation supplies a reset signal over line 193 setting counter 192 to 1. Upon CMDSEQ becoming active (FIG. 5), a gate enabling signal is received over line 197 from sequence control 175. AND circuits 198 respond to such gate enabling signal to supply the signal contents of counter 192 to decode 190. Decode 190 responds to such signal contents to step LSRM 188 to fetch device address, command word, and a set of constants for use in performance of each command (see FIG. 5). Such fetched signals travel over cable 196, through OR circuits 165, to gated destinations. CBO receives all signals read from LSRM 188 whenever SCMDO, SSVCO, or SADDRO are active. AND circuits 199 respond to any one of such STAG's to pass the LSRM 188 output signals to CBO. FIG. 7 illustrated circuits selectively receive the multiplying constant.

Control panel 160 has a read/write manually actuated switch which supplies a R/W signal over line 194 to decode 190. When LSRM 188 is being loaded, all operations are in the write mode at the address received from panel 160 over cable 164. After LSRM 188 has been loaded, a read enabling signal is continuously supplied to decode 190.

Counter 192 is incremented upon completion of each command fetched from LSRM 188. Step 3 signifies that the last byte count is being fetched. Clock signal C4 passes through AND circuit 191 during the single step 3 in CMDSEQ to update counter 192. Counter 192 has four stable states 1, 2, 3, and 4, and at 4, it automatically updates to 1 for recycling.

Comparator 180 (FIG. 7)

Comparator 180 compares signals from CBI or data flow 163 and byte counter 167 to detect sequence ends; i.e., a predetermined time delay or ripple-write cycle has been effected.

Referring next to FIG. 7, the output signals of OR circuits 165 (FIG. 6, Data Flow) are selectively gated to M REG 202 via AND circuits 200 by the set multiply or go-down control signal on line 201. This number is the multiplying factor indicating the length of desired ripple-write bytes or delay time. The data pattern in M REG 202 determines the modulus required in a cycle-determining sequence to generate COMP= for controlling special tag generator 170. The output signals of M REG 202 are statically supplied to EXCLUSIVE OR (ϒ) circuits 203. ϒ circuits 203 do an equality compare of the output signals from counter 204 with M REG 202 to generate COMP=. A signal on test line 205 selectively activates AND circuits 206 for completing the comparison thereby supplying a COMP= signal over line 207 to special tag generator (STAGEN) 170. COMP= not only indicates that the second mode timing delay or the desired number of bytes have been processed in the first mode, but also activates STAGEN 170 to supply a STAGO signal for stepping between first and second modes of operation. These actions will become more clear after reading the description concerning FIGS. 8 and 10.

Counter 204 in the second mode counts program reference signals gated by AND circuit 210 (via OR circuit 213) and in the first mode counts the number of times the bytes processed by controller 11 (number on CBI) equal the number in byte register 167. In the first mode, the byte register 167 signals and the CBI signals are Y'd in circuits 215 on a bit-by-bit basis ($2^0$, $2^1$, $2^2$ ... $2^n$ bit positions from the two inputs are respectively Y'd. The bit Y result signals pass over cable 216 to AND circuit 217. If all result signals indicate equality (Y function not satisfied), SVCI on line 218 from I/O controller 11 is passed by AND 217 incrementing counter 204. Note in FIG. 5 that SVCI is supplied only when a command is being performed in the first mode. In the second mode, AND circuit 210 gates the program reference signal on line 27 in response to a second mode mode signal received over line 211 from sequence control 175.

Counter 204 contents represent the number of program reference signals or the number of times a preset number of bytes have been processed. When counter 204 equals the count in M REG 202, AND circuits 206 supply COMP=. Counter 204 may include scaling; i.e., if M REG has four bit positions, counter 204 may have 22 bit positions with a selected four of same being connected to Y circuits 203.

Special Tag Generator 170

During maintenance procedures, tags or control signals (as above described with respect to FIGS. 2 and 3) are generated within test circuits 100 special tag generator 170. Such special tags are useful and necessary for sequencing diagnostic procedures in the same manner as CPU sequences controller 11 during data processing operations.

Figure 8:
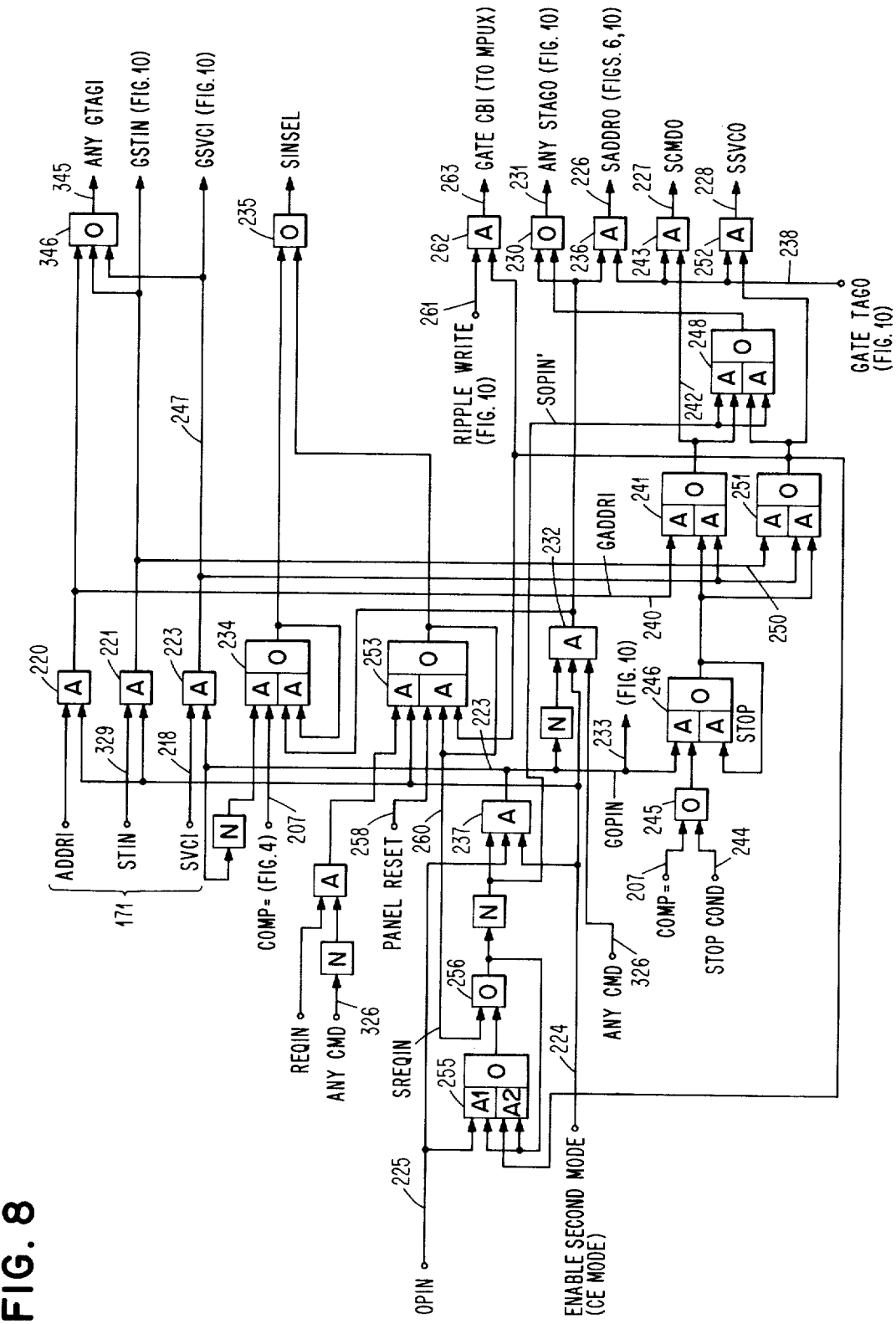
FIG. 8 is a simplified diagram of special tag generators usable with the FIG. 4 operation and useful for recycling control functions within the FIG. 2 illustrated apparatus.

Referring now to FIG. 8, sets of AND circuits receive the various inbound tags from MPUX. For example, AND circuits 220, 221, and 223 respectively receive ADDRI, STIN, and SVCI. These AND circuits are selectively actuated by the "CE mode" or enable second mode signal received over line 224 from panel 160. This line is activated during the entire maintenance procedure. The output of AND circuit 220 generates SCMDO, the normal CPU response to ADDRI. In a similar manner, the outputs of AND circuits 221 and 223 generate other STAGO's to simulate CPU responses. Note the inbound tags are all generated within the FIG. 2 illustrated apparatus as for use by CPU channel in data processing operations. The timing and circuits generating STAGO's are described in greater detail later.

Operation in (OPIN) is an inbound tag signal supplied by I/O controller 11 indicating that it is operational and is connected to the channel. MPUX supplies this tag signal over line 225 for generating SINSEL which is a CTO indicating the channel desires to initially select I/O controller 11. Therefore, such STAGO's are wrap-arounds of inbound tags such as CBO derived from CBI signals, etc.

STAGO's initiate new functions in controller 11. To facilitate sequence control, a single "ANY STAGO" signal on line 231 from OR circuit 230 activates sequence control 175 and M-clock 186 as will become apparent.

SADDRO is generated only during initial selection sequences for controller 11. AND circuits 232 and 236 supply this STAGO in response to CE mode on line 224, to GOPIN, ANY CMD on line 326, and to SRE-QIN (special request in) from A–O 253. AND circuit 237 activates AND 232, which in turn activates AND circuit 236 to supply SADDRO at GATE TAGO time indicated by the signal on line 238 from sequence control 175.

A–O circuits 234 are responsive to AND circuit 232, the COMP= signal on line 207 and the CE mode signal on line 224 to provide SINSEL through OR circuit 235. SINSEL replaces the address compare and resulting SELO of usual data processing operations. The address compare function is not performed.

The other TAGO signals SCMDO and SSVCO are used in connection with operating portions of the I/O controller 11. SCMDO indicates a change in operating status, while SSVCO indicates a byte of data is ready to be exchanged. To generate SCMDO, I/O controller 11 must have responded to SADDRO with an ADDRI or the last byte of data has been processed. AND circuit 220 passes ADDRI signal over line 240 to the AND circuit portion of A–O circuit 241. GADDRI of line 240 is passed directly over line 242 to AND circuit 243 for generating SADDRO with gate TAGO signal on line 238. SCMDO terminates the first mode of operation whenever COMP= signal on line 207 or a stop condition signal on line 224 from control panel 160 is supplied through OR circuit 245, thence, A–O blocks 246 and 241. This action corresponds to ending status in CPU associated operations. A–O circuit 246 gates either GOPIN from AND 237, COMP= or stop condition signal; that is, SCMDO will not be internally generated by COMP= unless OPIN has been supplied, i.e., I/O controller is already operating. A–O circuit 246 is connected as a clock latch and supplies its output signal to a second AND portion of A–O circuit 241 in which it is combined with gated SVCI (GSVCI) signal received over line 247. Hence, GADDRI generated SCMDO signifies the initiation of a first mode operation, while the COMP= or stop condition initiated SCMDO signifies the end of a first mode operation.

SSVCO is generated in two ways, either by gating OPIN with either the GSTIN on line 250 via A–O 251 or by combining the GSVCI with the A–O 246 output signal in a second AND portion of A–O 251. A–O circuit 251 supplies its output directly to AND circuit 252 to generate SSVCO signal on line 228. A–O circuit 251 output is also combined in A–O circuit 248 for generating ANY STAGO signal on line 231.

GOPIN on line 233 from AND 237 represents OPIN gated by second mode signal and latch 255–256 inactive. SREQIN from A–O sets latch 255–256 blocking GOPIN during SREQIN. This action allows a short sequence in test circuits 100 to capture the interrupt (SREQIN) without involving data flow 163. The details of such controls are beyond the present description.

A–O circuit 253 is SREQIN latch generating SINSEL via OR 235. It is reset from panel 160 over line 258 or dropping the enable mode signal on line 224. A–O circuit 251 also resets latch 253 signifying end of SINSEL. Accordingly, GOPIN is supplied over line 254 as long as $\overline{\text{SREQIN}}$ and the OPIN signals are supplied, or as long as gate SSVCO is supplied while OPIN is active.

A ripple-write control signal received over line 261 from panel 160 enables AND circuit 262 to pass the gate SSVCO signal from A–O circuit 251 for gating the ripple count supplied by MPUX (FIG. 11) to CBO. AND circuit 252 supplies its output signal (SSVCO) over line 228 to MPUX as a BOC enabling CBI to be incremented by the resident microprograms.

The cooperative relationships between the special tags in and the special tags out will become apparent from a continued reading.

Other Controls 185 (FIG. 4)

This control circuit, inter alia, determines whether or not another cycle of clocks C1-C4 is to be reinitiated or the I/O controller is to be stopped. All operations are synchronized by the C REG sync signal received over line 285 from comparator 180. Referring first to FIG. 7, the C REG 160A supplies its staticized signals over cable 161. Remember, C REG 160A is manually set from panel 160. In this manner, C REG determines by manual selection when controls 185 are to make their logic determinations. These circuits also respond to the cable 161 C REG signals and to selected signal-state conditions in MPUX or MPUY to coordinate maintenance procedures with respect to those MPU's. Such procedures are not a part of the present invention.

M-Clock 186

M-clock 186 provides four pulse cycles synchronizing circuit operation. For the clocking operation, a panel start pulse or ANY CMD (see FIG. 10) supplied to OR circuit 265 or $\overline{\text{STEP 3}}$ signal from FIG. 10 circuits enables AND 266 jointly with the clock GO signal received over line 267 from sequence control 175. These conditions being satisfied, a GO CLOCK signal on line 268 sets GO CLOCK latch 269 to the active condition. The active signal enables oscillator 271 to operate. The oscillator pulses are supplied to MOD 4 counter 272 which has its four-phase outputs C1, C2, C3, and C4 supplied as overlapping clock sequence pulses to the circuitry in test circuits 100. The generation of such sequence of clock signals and their timing relationships are well known and not further described for that reason.

C4 is a reference or nonoperating condition clock phase. Accordingly, the active signal on line C4 is supplied over line 273 for resetting GO CLOCK latch 269 only when GATE TAGO line 238 signal enables AND circuit 279. If the conditions satisfying AND circuit 266 persist, AND circuit 266 GO CLOCK signal again sets GO CLOCK latch 269 to repeat a four-phase cycle C1-C4. As such, the clock cycles can be automatically repeated. By removing the panel start or any of the other conditions into OR circuit 265, one clock cycle may be performed at a time.

M-clock 186 also provides other clocking functions via other clock controls 278. These include stepping by instruction cycle, etc.

Sequence Control 175

Sequence control 175 is the heart of test circuits 100. It coordinates circuit operation to effect the above-described functions in addition to other functions not described because they do not relate to the present invention. FIG. 10 illustrates sequence control 175 in an abbreviated and simplified form for enhancing an understanding of the present invention. The portions apertaining to an understanding of the detailed description include mode control 319 which distinguishes between the first and second modes of operation, step generator (STEPGEN) 320 which generates the stepping control signals mentioned with respect to FIG. 5, transfer control 321 which sequences signals from the panel to test circuits 100 and establishes a ripple-write condition, and finally tag-clock control 322 which supplies control signals for tag generator and the M-clock. Not shown are additional sequence controls used for other maintenance purposes not pertinent to the practice of the present invention.

Mode control 319 indicates first or second mode in accordance with the stable state of an ANY CMD flip-flop 325. When flip-flop 325 is in the binary 1 stable state, the first mode is indicated by an activating signal supplied over line 326 to FIGS. 8 and 9 as well as to other portions of test circuits 100. When ANY CMD flip-flop 325 is in the zero state, the second mode activating signal is supplied over line 211 to FIG. 7 as well as to other portions of circuits 100. Upon machine start-up as indicated by a master reset signal on line 334, ANY CMD flip-flop 325 is reset via OR circuit 333. Upon completion of the first second mode operation, i.e., the initial delay described with respect to FIG. 5, and without ending status or STATIN signal as indicated by the output signal of NOT circuit 336, AND circuit 335 passes clock signal C4 to set ANY CMD flip-flop 325 to its binary 1 stable state, thereby initiating the first mode. The first mode is maintained until ending status is provided by I/O controller 11 to test circuits 100.

Ending status is a code supplied over CBI indicating to the I/O channel that the status is ending status. Such ending status is well understood in the I/O subsystem area. In this particular case, bit 6 of CBI being a 1 and all other bits being 0 indicates ending status. CBI is sampled over line 328 by AND circuit 327 being actuated by the GSTIN signal received over line 250. AND circuit 327 supplies the gated ending status through OR circuit 330 to reset ANY CMD flip-flop 325. This signal also actuates NOT circuit 336 to block AND circuit 335. At all other times, NOT circuit 336 enables AND circuit 335 to pass clock signal C4. Hence, each C4 will repeatedly set ANY CMD flip-flop 325 during the first mode. Note that there is only one clock cycle during each second mode.

STEPGEN 320 is normally in the step 1 activating state. AND circuit 340 generates the STEP 1 signal in response to the step 2 and step 3 flip-flops 341 and 342 both being in the reset state. Logic circuits form the inputs to the two step flip-flops for logically setting same in accordance with the operational conditions of test circuits 100, rather than in a given sequence.

The ANY GTAGI signal on line 345 is combined with the STEP 1 signal for setting step 2 flip-flop 341. AND circuit 347 supplies the combined signals through clock signal C1 gated AND circuit 348. The inverse of the AND circuit 347 signal is supplied to AND circuit 349 which is also gated by C1.

Step 3 is used only during the first mode in the channel command acquisition sequences. AND circuit 355 is responsive to the first mode signal for gating GSTIN signal from line 250 to AND circuit 356. Clock signal C1 enables AND circuit 356 to set step 3 flip-flop 342. In a similar vein, the inverse of AND circuit 355 output signal is supplied to AND circuit 357 for passing clock signal C1 to reset step 3 flip-flop. In addition to the above logic, a reset pulse (not shown) resets both step 2 and step 3 flip-flops.

Transfer control 321 has four independently operating logic circuits. The first consists of A-O circuit 360 and AND circuit 361. These two circuits clock or time the manually inserted data into C REG shown in FIG. 6. A-O circuit 360 is set by clock signal C1 whenever an enabling signal is supplied from the panel to both AND circuit portions A1 and A2. The A-O circuit 360 remains in the active condition until the PANEL ENABLE signal is removed. AND circuit 361 supplies the SET C REG signal at time C3 in joint response to the panel SET C REG signal, second mode signal from line 211, and the STEP 1 signal from STEPGEN 320.

The ripple-write signal of FIG. 8 applied over line 261 is generated by A-O circuit 368. A-O circuit 368 assumes an active condition at clock time C3 whenever SCMDO on line 227 is active and CBO has a code signal indicating a write function. The decoding of CBO is not shown for simplicity purposes. A-O circuit 368 maintains the active condition on line 261 until GOPIN signal on line 233 becomes inactive at which time A-O circuit becomes inactive.

The SET M REG signal on line 201 is generated by A-O circuit 364. A PANEL ENABLE signal supplied through A1 portion of A-O circuit 364 enables the SET M REG register to receive signals from the panel. This enable signal is maintained as long as the PANEL ENABLE is provided. For automatic insertion of data signals into M REG, AND circuit A2 supplies the enabling signal. Clock signal C3, jointly with GSTIN signal on line 250 and the STEP 1 signal, provides the SET M REG signal on an automatic basis.

The fourth logic portion consisting of AND circuit 365 generates the SET BYTE signal used in FIG. 4 which is supplied over line 366. AND circuit 365 generates the SET BYTE signal in joint response to the STEP 2 signal, the GSTIN signal on line 250, and clock signal C3.

Tag-clock control 322 generates but three output signals. The first is the CMDSEQ signal supplied to the FIG. 6 illustrated apparatus over line 197; the second is the gate GATO signal supplied to the TAGGEN over line 238; and the last signal is the GO CLOCK signal supplied to M-clock over line 267. The CMDSEQ signal is generated by A-O circuits 370 and 371. A-O circuit 370 is for control and is jointly responsive to either an SADDRO signal on line 226 or C3 for synchronizing a signal to the input of A1 portion of A-O circuit 371. A-O circuit 370 acts as a synchronous delay for timing SADDRO into CMDSEQ A-0 circuit 371. A-O circuit 370 is a latch held active by SADDRO. CMDSEQ is also maintained by the GSVCI signal on line 247 in combination with the STEP 2 signal as supplied through A2 AND circuit portion of A-O circuit 371. Lastly, A3 AND circuit portion of A-O circuit 371 is jointly responsive to the STEP 3 signal and the GSTIN signal on line 250 to supply the CMDSEQ signal over line 197. CMDSEQ signal is also used to generate the GATE TAGO signal via logic elements 372, 373, and 374. Either CMDSEQ or SCMDO on line 227 supplies an input to AND circuit 373. GATE signal C3 gates the supplied signal to A1 portion of A-O circuit 374 and also holds A-O circuit 374 in the active condition as a phase-hold latch. The other input to A-O circuit 374 is supplied by AND circuit 376 in response to the control output of A-O circuit 370 and the GOPIN signal on line 233.

M-clock is activated by the GO CLOCK signal on line 267. In accordance with the input condition of AND circuit 377, any STAGO signal on line 231 after the GATE TAGO signal has subsided activates AND circuit 377 to supply a GO CLOCK signal.

Ripple-Write Generation

MPUX generates the ripple-write pattern supplied over CBI which is then wrapped around to CBO for supply to data flow circuits 13. This section of the description contains an abbreviated and simplified microprogrammed flowchart showing the steps MPUX executes in order to generate the ripple-write pattern.

| | |
|---|---|
| MPUX-1 | The microprogrammed initial selection sequences described in the Irwin application supra are performed. |
| MPUX-2 | STIN is activated with CBI receiving all 0's. CBI = all 0's indicates status is O.K. |
| MPUX-3 | Appropriate LSR 75 registers are cleared in preparation for containing the ripple-write numerical data. For example, LSR register 002 may contain the ripple-write data. |
| MPUX-4 | This portion fetches the first byte of the ripple-write pattern. This is generated in test circuits 100 and supplied to MPUX. STIN is turned off, i.e., CBI no longer contains status in. SVCI is turned on, i.e., MPUX is requesting test circuits 100 (as a substitute for the I/O channel) to supply the first byte of data. |
| MPUX-5 | MPUY is trapped to a write micro-routine for initiating the writing operation. Exchange registers in the I/O controller are set to the appropriate code for generating a write condition in data flow circuits 13 (see FIG. 35 of the Irwin application supra). |
| MPUX-6 | MPUX waits for data flow circuits 13 to sense whether or not the associated and addressed MTU is ready for a write operation. Upon receiving information that it is ready, MPUX-7 is performed. |
| MPUX-7 | SVCI is turned off indicating to the I/O channel (test circuits 100) that the first byte of data has been received and the next byte should be furnished, actually the next byte generated by MPUX. |
| MPUX-8 | MPUX senses for SSVCO. As soon as it is dropped, i.e., made inactive, MPUX-9 is performed. Until then, MPUX idles, continuously sensing for SSVCO. |
| MPUX-9 | A byte of data is transferred to MTU for recording. This is a transfer of contents of LSR register 002 to CBI. Test circuits 100 have wrapped CBI to CBO. Hence, the contents of 002 go to data flow circuit 13 for recording as if it were received from an I/O channel. |
| MPUX-10 | This is a branch-on-condition sensing for SSVCO. If SSVCO is inactive, MPUX-11 is performed. If it is active, MPUX-12 is performed. |
| MPUX-11 | This is a branch-on-condition wherein MPUX senses for SCMDO. If SCMDO is active, a terminating microprogram is entered; and the write operation is ended. At this time, the second mode is re-established by test circuits 100. If SCMDO is inactive, MPUX-10 is entered. |
| MPUX-12 | This step generates the ripple-write. Unity, or another constant, is added to the numerical contents of LSR register 002. In this particular illustration, when the modulus of LSR 002 is exceeded, another ripple-write pattern is being generated. In the alternative, MPUX may be programmed to generate signals for test circuits 100 for stopping the ripple-write pattern. Note that test circuits 100 count the bytes recorded by generating a signal in accordance with the SSVCO, which is an indication of the number of bytes recorded by data flow circuits 13. |

While the invention has been particularly shown and described with reference to a preferred embodiment thereof, it will be understood by those skilled in the art that various changes in form and detail may be made therein without departing from the spirit and scope of the invention.

What is claimed is:

1. A multimode programmable machine,
   a microprocessing portion having a plurality of program step means,
   a multimode cyclable program loop including a predetermined number of control program step means,
   means establishing first and second modes of operation in said machine,
   means having first sequences of machine operation cooperating with a first group of said control program step means being branch-on-condition steps and which first sequences are operative during said first mode to interrupt said cyclable program loop to selectively execute said first sequences upon certain events occurring in the machine,
   means having second sequences of machine operation cooperating with said first group of said step means and operative during said second mode to supply first timed control signals of momentary duration in accordance with a continuous recycling of said program loop for indicating elapsed time, and
   said machine having circuit means responsive to said control signals to perform predetermined machine functions in accordance therewith.

2. The machine set forth in claim 1 wherein said second mode of operation relates to the maintenance of the machine and said second sequences of machine operation are timing delays,
   a manual control panel means in said means having second sequences through which second control signals for said second sequences are insertable into said machine and including register means for storing a count control number, and
   further including electrical circuit means jointly responsive to said control panel control signals and to said cyclable program loop to effect repetitive machine timed delay operations while automatically interleaving said first and second modes of operation.

3. The machine set forth in claim 2 wherein said electrical circuit means includes a digital counter, an electrical comparator jointly responsive to said counter and register means in said manual control panel means for generating a comparison signal, said cyclable program loop supplying synchronization signals for incrementing said counter, transfer network means resettable by said manual control panel means for automatically and sequentially setting different count control numbers in said register means for generating said comparison signal at different counts in said counter whereby the periodicity of said comparison signal is jointly determined by said manual control panel and said cyclable program loop repetitions.

4. The machine set forth in claim 3 wherein said electrical circuit means further includes an LSRM local store, and program registering means under control of said manual control panel means for selectively transferring bytes of digital signals from said LSRM local store to said comparator for providing a sequence of different comparison operations as part of manual control panel means initiated diagnostic operations in said machine, and means sequencing said first and second modes alternately and said comparator making comparisons for both modes, and connection means in said electrical circuit means operative during said first mode to supply signals to said counter.

5. The machine set forth in claim 4 having a CBI (channel bus in) and CBO (channel bus out), said CBI receiving signals from said microprocessing portion and CBO being for supplying signals to such microprocessing portion and circuit means responsive to said manual control panel means for selectively interconnecting said CBI to said CBO whereby signals on CBO are returned to CBI, said connection means coupling said CBI to said comparator for comparison with data patterns transferred from LSRM to said comparator.

6. The machine set forth in claim 2 further including electrical circuit means responsive to said manual control panel means for imposing branch conditions in said microprocessing portion,
   an LSRM memory means responsive to said manual control panel for maintaining data patterns,
   said electrical circuit means selectively transferring said data patterns from said LSRM memory means to said microprocessing machine, and
   comparison means jointly responsive to data pattern signals fetched from said LSRM memory means and said first control signals from said cyclable program loop to generate command sequence control signals usable in said machine.

7. A programmable machine having a sequence of predetermined program steps which are electrically inalterably installed in said machine including sets of data processing and programming operational portions for performing data processing functions,
   first logic means in said machine responsive to said steps to perform a set of first internal machine operations relatable to said sets of data processing and programming operational portions, and
   second logic means in said machine for selectively recycling said program steps and means responsive to said recycling to perform a set of second internal machine timing delay logic functions different from data processing functions in said set of data processing and programming operation portions and means inhibiting operation of said data processing and programming operation portions.

8. The machine set forth in claim 7 further including control means alternately actuating said first and second logic means with said second logic means establishing timing delays such that successive operations by said first logic means are time separated.

* * * * *